US005078829A

United States Patent [19]

[11] Patent Number: 5,078,829

[45] Date of Patent: Jan. 7, 1992

Morosini

[54] DEVICE FOR PICK-UP AND ASSEMBLY OF ELEMENTS OF IDENTIFICATION OF CABLES AND ELECTRICAL APPLIANCES

[76] Inventor: Flavio Morosini, 18, rue du Rouvion, F-54800 Hatrize, France

[21] Appl. No.: 485,214

[22] Filed: Feb. 26, 1990

Related U.S. Application Data

[63] Continuation-in-part of Ser. No. 218,288, Jun. 13, 1988, Pat. No. 4,904,335.

[30] Foreign Application Priority Data

Aug. 14, 1986 [FR] France ............ 86 11768
Jul. 31, 1987 [IT] Italy ............ 43519 A/87

[51] Int. Cl.[5] ............ B32B 31/16

[52] U.S. Cl. ............ 156/584; 156/344; 269/47; 269/50; 269/900; 269/909; 40/316

[58] Field of Search ............ 269/47, 50, 900, 909; 174/112; 283/74, 79, 81; 312/183; 156/394, 584; 40/316, 490, 530

[56] References Cited

U.S. PATENT DOCUMENTS 4,206,909 6/1980 Wintle ............ 40/316 X
4,268,986 5/1981 Piana ............ 40/316
4,603,924 8/1986 Piana et al. ............ 312/183
4,649,658 3/1987 Sarton et al. ............ 40/316
4,904,335 2/1990 Morosihi ............ 156/584
4,947,568 8/1990 De Barbieri ............ 40/316

FOREIGN PATENT DOCUMENTS 0452017 5/1968 Switzerland ............ 40/316
0607245 11/1978 Switzerland ............ 174/112

*Primary Examiner*—Michael W. Ball
*Assistant Examiner*—Mark A. Osele
*Attorney, Agent, or Firm*—Horst M. Kasper

[57] ABSTRACT

A device comprises a comb comprised of at least two dismountable parts of which the successive teeth belong alternatingly to a first part and to a second part and are separated, on the assembled comb, by a pitch equal to the pitch which separates two branches of a prehension means for taking identification elements. The identification elements can be threaded in the supports carried by both teeth of the assembled comb so that two coded messages are simultaneously composed and are separated by dismounting the comb. The labelling device can be employed for marking the two ends of an electric wire individually.

22 Claims, 12 Drawing Sheets

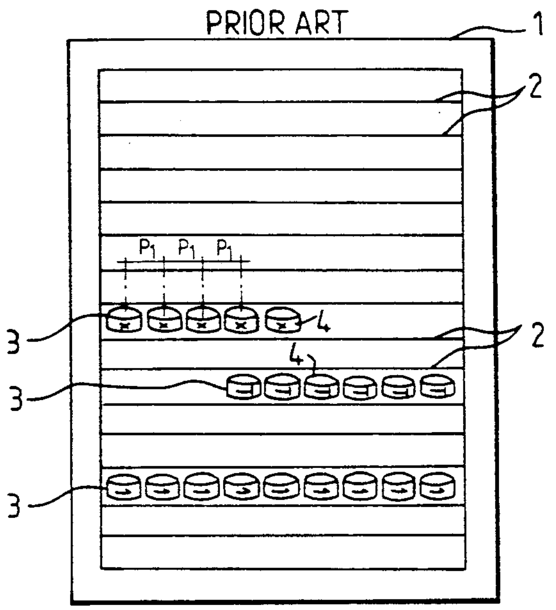
FIG. 1
FIG. 2
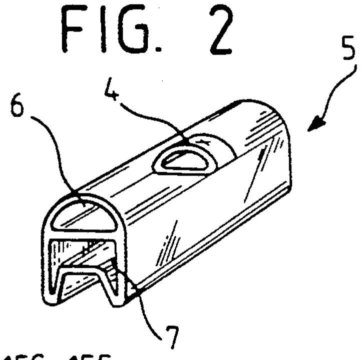
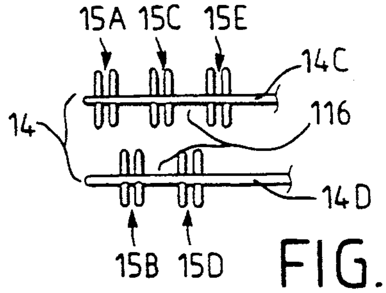
FIG. 10
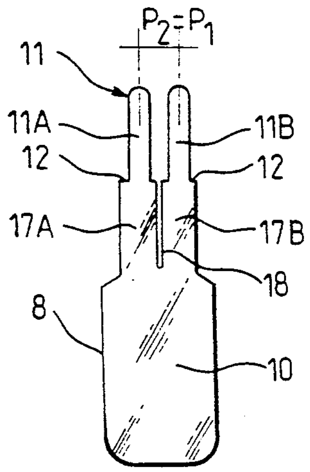
FIG. 3
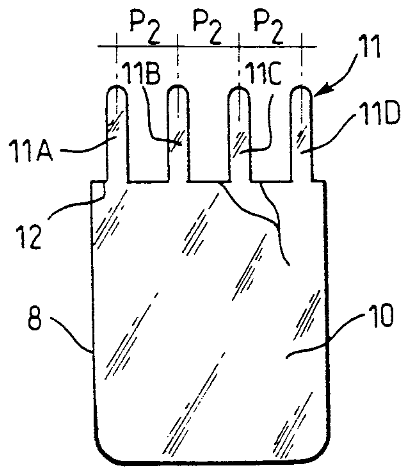
FIG. 4
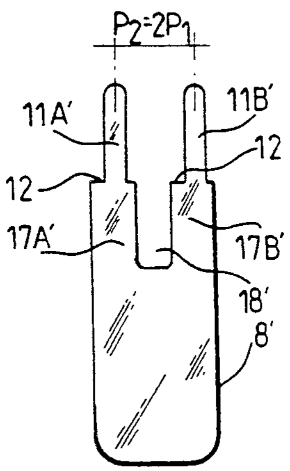
FIG. 5
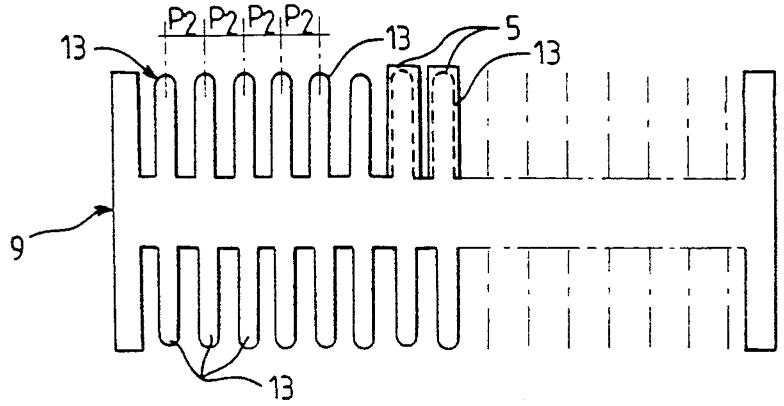
FIG. 6

DEVICE FOR PICK-UP AND ASSEMBLY OF ELEMENTS OF IDENTIFICATION OF CABLES AND ELECTRICAL APPLIANCES

CROSS REFERENCE TO RELATED APPLICATIONS

This application is a continuation-in-part application of another application filed June 13, 1988 and bearing Ser. No. 218,288 now U.S. Pat. No. 4,904,335. The entire disclosure of this latter application, including the drawings thereof, is hereby incorporated in this application as if fully set forth herein.

BACKGROUND OF THE INVENTION

1. Field of the Invention

The present invention relates to a device which greatly facilitates the pick-up and assembly of elements of identification according to a well-defined code, where the elements of identification are used for locating the wire strands at two distant ends of an electric cable, or the terminals of electrical appliances.

2. Brief Description of the Background of the Invention Including Prior Art

Various types of elements of identification are known in the art. These elements of identification can, either totally or in part, consist of a link or a sleeve or at least of a ring-shaped configuration, into which a rod can be introduced. The rod enables the pick-up of one specific element from the entire assembly of elements. An example of elements of identification of this type with which the device of the invention can be used is disclosed in French Patent FR-A 2,239,182. In this reference, tubular elements of identification are described which bear a symbol, either a number or a letter, and which are arranged in order in the switch cabinet in rows of several elements, whereby each row bears identical symbols. A short measuring tape is designed to be successively threaded into several ring-shaped elements which are picked up, one by one, in the desired order, to compose a message code of identification, for example, a number. The elements which compose this message are then transferred, as a whole, on a carrier for the message code of identification already fixed or destined to be fixed on a wire strand of a cable or on an electric terminal. Hence, each message of identification is composed individually, element by element.

Known means of identification include the following:

a carrier with distinct rows for the elements of identification, the elements of identification, at least partially tubular, are arranged in order on these rows and are spaced by a defined first step Pl and bear in each row an identical symbol, the carriers are constructed to each receive a series of elements of identification, thus composing a message code of identification, a means for picking-up these elements of identification which has a section which can be threaded into a tubular part of the elements of identification.

SUMMARY OF THE INVENTION

1. Purposes of the Invention

It is an object of the present invention to provide a device which permits at least a doubling of the speed with which tubular elements of identification are picked up and message codes of identification for wire strands or electric terminals are composed.

It is a further object of the present invention to compose simultaneously pairs of message codes of identification which are identical, and to enable an easy separation of messages of identification of each identical pair for locating the two distant ends of the wire strands without the risk of error in the messages intended for these two ends.

It is yet a further object of the invention to provide a labelling device securing all labels to be disposed in a plane and safe against shifting into another direction.

It is an object of the invention construction to avoid any obstacle and impediments when the points of the gripper move toward the body center part of a comb.

These and other objects and advantages of the present invention will become evident from the description which follows.

2. Brief Description of the Invention

The present invention provides for a device for attaching coded messages of identification to wire strands and electric terminals. Each element of identification comprises a coded message of identification. Carriers include an elongated body and are adapted to receive and carry each a series of elements of identification in a removable manner. Each individual carrier is adapted to be mounted to a tooth of a respective comb at a minimum first step distance. A first comb has a first body with teeth arranged in parallel at two opposite sides of the first body, where said teeth are spaced at a second step distance. A second comb has a second body with teeth arranged in parallel at two opposite sides of the second body, where said teeth are spaced at a second step distance. The second body is attached in a substantially parallel position to the first body to form a combined comb. In this way, there is generated an alternate sequence of teeth belonging to the first comb and of teeth belonging to the second comb, arranged on common elongated parallel teeth of the combined comb. The value of the second step distance is a simple multiple of a value of a first step distance disposed between the alternating teeth of the first comb and of the second comb on the combined comb. The teeth are adapted in their position of being uniquely associated with respective wire strands or electrical terminals.

The teeth of the second comb can be disposed at a level parallel to the level of the body of the second comb, but can be displaced in a direction perpendicular to the second comb body by a spacing amounting to about the thickness of the first comb. This allows a positioning of the second comb relative to the first comb such that the teeth of the first comb and the teeth of the second comb can be disposed in a single plane.

The first comb can form a first half of the combined comb. The second comb can form a second half of the combined comb. The two halves can be assembled and separated on joint faces. Preferably, the successive teeth of the combined comb belong, alternately, to the first half or to the second half of the combined comb and are being separated from each other by a step distance.

The first comb can form a first half and the second comb can form a second half. The first half of the combined comb and the second half of the combined comb can be assembled and separated by appropriate means on one or the other of joint faces of appropriate thickness. Successive teeth of the combined comb can belong, alternately, to one or the other half, and can be divided on one half into pairs of two teeth. The pairs can be separated by a space interval capable of receiving a pair of two teeth belonging to the other half. The successive teeth can be separated on the combined comb by the second step distance.

The teeth of the second comb can be disposed in a manner such that all teeth of the combined comb can be arranged along one substantially planar surface once the two halves are assembled.

A pick-up can include at least two parallel arms. The arms can be spaced at a second step distance which can be identical to the second step distance of the teeth of the comb. Preferably, each of these arms possesses an extreme part capable of being threaded into the tubular section of the elements of identification and limited at the end opposite to the free end by a detent collar.

The device for applying coded identification messages onto wire strands and electric terminals comprises partly tubular elements of identification. Distinct carrier rows support the partly tubular elements of identification. The partly tubular elements of identification are disposed on the distinct carrier rows spaced relative to each other by a defined first step. The elements of identification carry the same symbol on each carrier row. The carrier rows are capable of receiving each a series of elements of identification including a coded message of identification. Each element of identification is capable of being coordinated to a respective wire strand and an electrical terminal in order to identify the respective wire or terminal. A comb with distinct teeth rows supports the carrier rows.

The teeth of the comb can be arranged in parallel and spaced at a second step distance. The value of the second step distance can be equal to, or equal to a simple multiple of the value of a first step distance of the elements of identification disposed on the carrier rows. These teeth can conform to receive and carry, in a removable manner, said carrier rows for the elements of identification.

The comb can be formed as a combined comb composed of a first comb section with a first set of teeth and of a second comb section with a second set of teeth, assembled and detachable along one or the other of joint faces. The combined comb can consist of two half comb sections. Successive teeth of the assembled combined comb can belong, alternately, to one or the other half and can be separated on each half by a second step distance. The teeth of one of the halves of the combined comb can be arranged in such a manner that all teeth of the combined comb can be arranged on one and the same face of the combined comb once the two halves are assembled.

The combined comb can comprise two halves joined together by attachment means along a joint abutting face on each half. Successive teeth of the assembled combined comb can belong, alternately, to one or the other half. Said teeth can be divided on one half into pairs of two successive teeth having a spacing interval in between capable of receiving a pair of two teeth belonging to the other half. Successive teeth can be separated on the assembled comb by a second step distance. Preferably, the teeth of at least one of the halves of the combined comb are transported in a manner so that all teeth are arranged in a single plane after attaching of the two halves to each other.

The device of the invention comprises a comb with parallel teeth which are spaced by a second step P2, the value of which is equal to or several times the value of a first step P1 of the elements of identification of a combined comb. Each of these teeth is designed to have mounted, in a removable manner, a carrier of a series of elements which compose a message code of identification. A means of pick-up includes at least two parallel arms which are spaced at a step P2 which is identical to the step P2 of the teeth of the comb. Each of these arms has a very straight part which can be threaded into the tubular section of the elements of identification. This straight part is limited, opposite to its free end, by a stop catch.

According to an improvement and further development of the invention, the comb comprises or consists of two halves which can be easily assembled or separated and of a joint interface, where the thickness of said halves permits the interface to be fitted between the two halves. The successively arranged teeth of the comb belong, alternately, either to the one or the other half. Preferably, the teeth of at least one of these halves are off-set so that all teeth are on the same face once the two halves are assembled.

One of the main objects of the instant system for for marking with guide and/or labelling marks is to prepare in advance a multiplicity of guide and/or labelling marks and to distribute them easily at whatever point of an installation a placement might be desired. The objective is to avoid loss of time and material. Starting with the known elements, such as; for example, tubular sections marked with the symbols +, −, 0 to 9, A to Z, etc., one is in a position to compose any desired writing for a marker. Starting from the face that similar marks are found all along an electric conduit system, i.e. at each wire, it is necessary to mark the wire on each side of the terminal and sometimes the terminal itself carries the same mark. At the present time, in order to put together the desired mark, for example, the characters A to Z, the operator would have to restart four times the compilation and assembly of the same mark. According to the present invention, this can all be done in one single operation. In fact, by placing one gripper having four points, one can compile and position four desired marks in one single operation.

One remaining problem is a problem of distribution. This problem of distribution has been solved by employing detachable combs which combs, once assembled, have the feature that the respective teeth follow each other and belong successively to a comb 1 (first tooth), to comb 2 (second tooth), to comb 3 (third tooth), and then to comb 4 (fourth tooth). Then the same cycle starts again at comb 1 with the fifth tooth, comb 2 with the sixth tooth, comb 3 with the seventh tooth, comb 4 with the eight tooth. Then the cycle starts anew as many times as one desires. The step of the comb elements, which form the detachable comb when assembled, will have a tooth step distance which will be a multiple value with a natural number of times the step of two branches of the double gripper comb in the case of 4 times the second distance spacing P2.

The assembly of these comb elements cannot be performed in just any way. The most suitable assembly is to align all teeth on the same plane. To bring about this condition, the fourth comb will exhibit a U-shaped center section. Three other combs will be lodged to be placed within the U-shaped center section of the fourth comb. In this case, two of these three combs (the second and third comb) would also exhibit a U-shaped center section. The first comb will be formed flat.

The assembly method of the comb elements is the following in order to provide a detachable combined comb. The fourth comb element is characterized by its U-shaped center section, whereas the last comb element has the U-legs disposed at right angles relative to a straight and/or flat comb body. The position of the teeth determines an alignment plane for all the teeth of the combined comb.

Between these two outer end elements, provided by the first comb and the fourth comb, there can be disposed, according to need, a number of comb elements, where the center part would have the shape of a U, and where the comb elements interlock with each other. The length of the legs of the U depends on the relative position of a respective comb element. Once the combined comb is assembled, all the teeth of the different comb elements will be aligned along a single plane, which is the plane of the last element which has a planar, flat shape.

The novel features which are considered as characteristic for the invention are set forth in the appended claims. The invention itself, however, both as to its construction and its method of operation, together with additional objects and advantages thereof, will be best understood form the following description of specific embodiments when read in connection with the accompanying drawing.

BRIEF DESCRIPTION OF THE DRAWING

In the accompanying drawing, in which are shown several of the various possible embodiments of the present invention;

FIG. 1 is a top view of a conventional carrier with distinct rows carrying the conventional elements of identification;

FIG. 2 presents a perspective view of a known carrier for elements of identification composing a message code of identification;

FIG. 3 is a top view onto a first embodiment of a pick-up in accordance with the invention;

FIG. 4 is a top view onto a second embodiment of a pick-up in accordance with the invention;

FIG. 5 is a top view onto a third embodiment of a pick-up in accordance with the invention;

FIG. 6 presents a top view onto a comb in accordance with the invention which can be used with the pick-up according to FIG. 3;

FIG. 10 illustrates a variation of the comb according to the invention;

DESCRIPTION OF INVENTION AND PREFERRED EMBODIMENT

Figure 7:
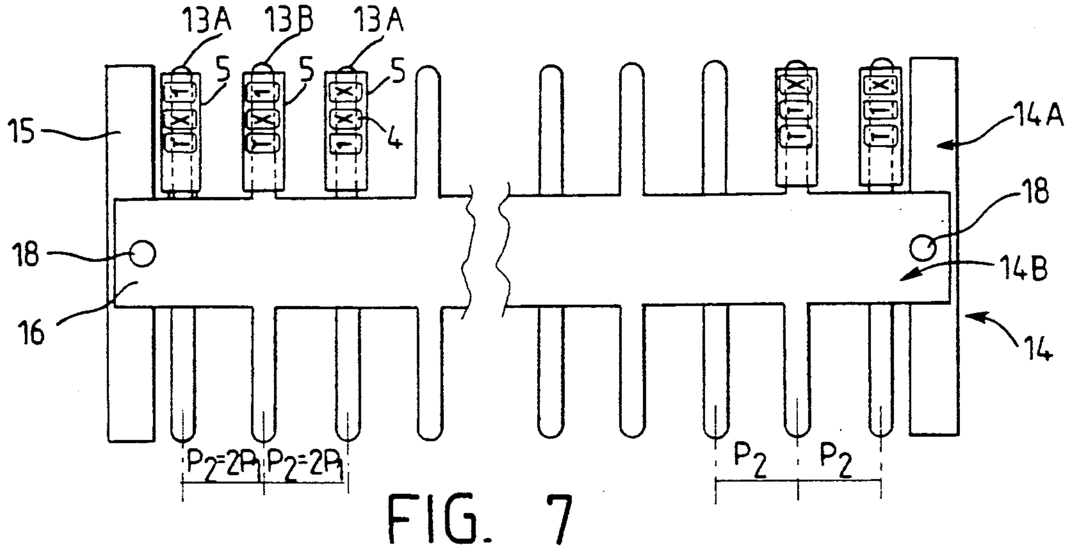
FIG. 7 presents a top view onto a comb in accordance with the invention which can be used with the pick-up according to FIG. 5 and which can be separated into two halves.

FIG. 1 shows a switch cover 1, where the inside of the switch cover 1 is divided by inclined parallel partitions 2. Successive rows 3 of tubular elements of identification 4 are arranged on the partitions 2. These tubular elements are formed by the end pieces of plastic tubes, with an out-of-rounds cross-section. On the outer face of each of the elements 4 is imprinted an identification symbol, for example an X, or a T, or a 1, or any other sign. On an identical row 3, all elements of identification 4 bear the same symbol. On each row, the elements 4 are spaced at a defined step P1. The elements 4 are fastened on the inclined partitions 2 by means of an adhesive material which permits their removal with a minimum of force. Such an assembly is well known and commercially available.

FIG. 2 shows a conventional carrier 5 which is designed to receive several elements of identification 4 which are arranged in order for composing an identification message. This carrier 5 consists of an assembly of end pieces of double tubes of a transparent and flexible plastic material. The carrier 5 exhibits a first tubular section 6 and a second tubular section 7. The latter serves to join the carrier 5 to a wide strand or to a cable to be identified, i.e. the strand or the cable can be threaded through this second tubular section 7. The first tubular section 6 has an inner cross-section which is analogous to and matches the outer cross-section of the elements of identification 4e. This permits the threading of the latter with a minimum of force and holding the threaded elements 4 in place by the natural elasticity of the material. Only one such identification element 4 is illustrated in FIG. 2.

FIGS. 3 and 4 show a pick-up means 8 according to the invention which can be used with the comb 9 of the invention, depicted in FIG. 6. The pick-up means 8 has a flat body 10 so that it can be held easily with the fingers of a hand. One of the ends of the pick-up means 8 is equipped with several parallel arms 11. The pick-up means 8 of FIG. 3 is equipped with two arms 11A and 11B and the pick-up means of FIG. 4 with four arms, 11A to 11D. This number is only limited by the preferred way of using the pick-up means. The parallel arms 11A to 11B are spaced by a step P2, the value of which is equal to the value of step P1 of the elements of identification 4 in the switch cover 1. Each arm 11 is delimited opposite to its free end, but preferably on two opposing ends, by a collar 12. These collars 12 determine the length of the arms 11, their length being equal to the length of the carrier 5. These collars 12 serve as detent stops for the elements of identification 4 which are threaded on the arms 11.

The comb 9 is equipped with teeth 13 attached to the comb body on two opposite sides. These rows of teeth 13 are disposed parallel to each other and spaced by a second step distance P2 which is equal to a corresponding step of the arms 11. The cross-section and the length of the teeth 13 are chosen for their capability of accepting a threading or attaching of a carrier 5 of FIG. 2 by introducing a tooth 13 into the second tubular section 7 of the carrier. Each carrier 5 threaded onto a tooth 13 is retained in place by friction and can easily be removed with a minimum of force. FIG. 5 only shows two carriers 5 threaded onto two teeth 13. In this state, the first tubular section 6 of all carriers 5 is on the same side of comb 9. It is thus easy to simultaneously pick up several elements of identification 4 in the switch cover 1 with the pick-up means 8, by introducing the arms 11 of the latter into several elements of identification 4. The elements of identification are successively arranged at spaces of a first step distance P1. The first step distance P1 is equal to the second step distance P2 of the arms 11. Then, having picked up several identification elements 4, they can be introduced simultaneously into the first tubular section 6 which has an equal number of carriers 5 which are supported on the teeth 13 of the comb 9. During this operation, each element 4 can slide along the arm 11 with which it has been picked up but is finally stopped by the collar 12 against which an innermost identification element comes to rest. It can then be forced to a desired depth inside the first tubular section 6. FIG. 7 shows elements 4 successively threaded in the carriers 5 at different depths in order to compose a message code of identification, for example TX1 or TTX, simultaneously in several carriers 5.

In this way it is possible to prepare on one or several combs 9, a large number of carriers 5 which each carry the same message code of identification as a function of the number of arms 11 of the pick-up means 8. This number is only limited by the way in which one wishes to use the pick-up means.

FIG. 5 shows a pick-up means 8 which is identical to that of FIG. 3 and consists of two arms 11A and 11B, with the difference, however, that the arms 11A' and 11B' are spaced at a second interval spacing P2 which is twice the first step spacing P1.

Under certain circumstances, the carriers 5 may be of a size which makes it difficult or even impossible to thread them on successive teeth 13 of the comb 9, separated by a step distance P2=P1. In such a case, step distance P2 of the teeth 13 is given a value which is an integral multiple of P1. Naturally, this value is also given to the interval which separates the axes of the arms 11. In the switch cover 1, the elements of identification 4 remain at the distance of the value P1. During pick-up, the elements 4 are thus not next to, but separate from step P2. FIG. 7 shows a comb 14 with teeth 13 separated by a step distance P2=2P1 which can be used with the pick-up means 8' of FIG. 5.

Figure 8:
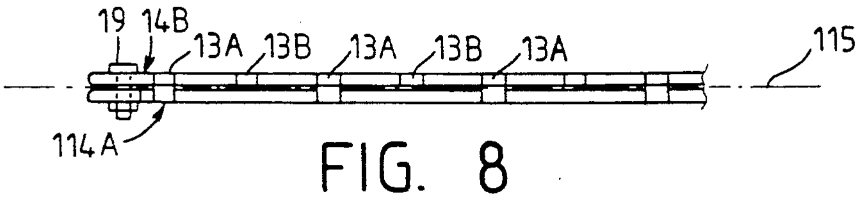
FIG. 8 presents a front view of the comb according to FIG. 7.
Figure 9:
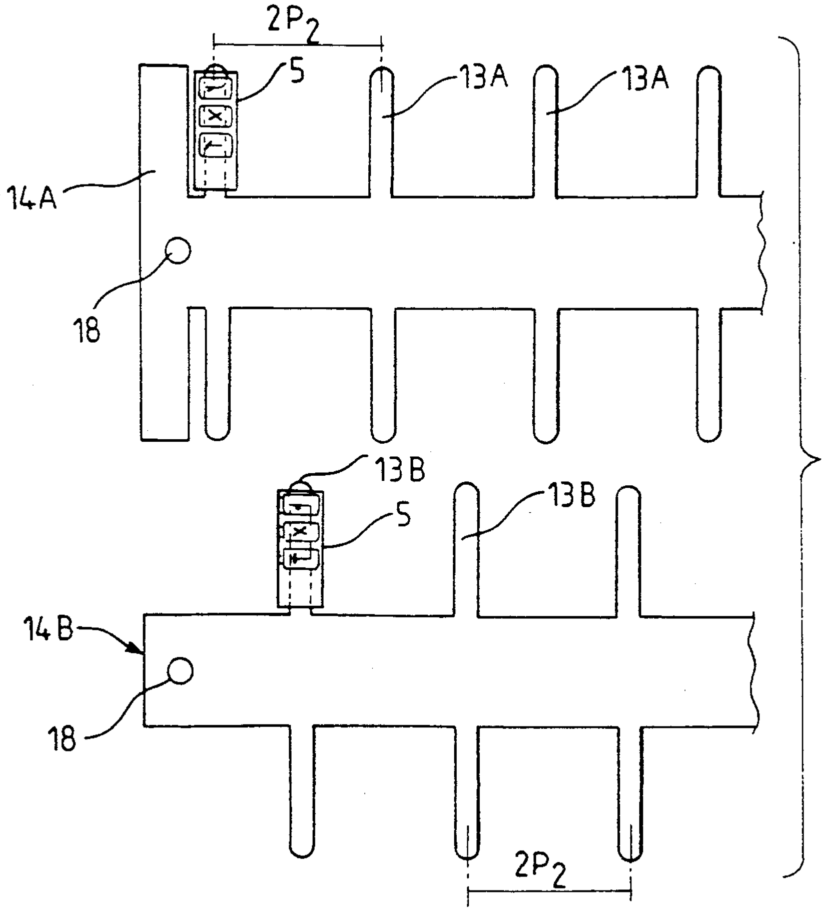
FIG. 9 presents a view of the comb according to FIG. 7, separated into two halves.

According to a further development and improvement of the invention, the comb 14 of FIG. 7 has an additional feature. It consists of two halves 14A and 14B which are assembled but can be separated by a joint face 115 of suitable thickness, as shown in FIGS. 8 and 9. The joint face 115 is depicted in FIG. 8 by a dot-and-dash line. The word "half" does not mean that the comb 14 is strictly separated into two identical parts. It means that one half of the teeth, possibly minus one unit, belongs to a first small plate 15 and that the second half of this number of teeth, possibly plus one unit, belongs to a second small plate 16. Therefore, successive teeth belong, alternately, to the second small plate 15 and to the first small plate 16 upon assembling and attaching to one another of the two small plates 15, 16. We distinguish, therefore, between the teeth 13A of the second comb 14A and the teeth 13B of the first comb 14B. The two small plates 15, 16, provided with teeth, are assembled by any possible means which permit their joining and separating in an easy and rapid manner. Assembled appropriately, they are ready for use. FIGS. 7 and 8 show that, for such an assembly, holes 18 and screws 19 are provided.

It is preferable to have all teeth 13A and 13B on the same face once the two halves 14A and 14B have been assembled. FIG. 8 shows that the teeth 13A of the small plate 114A have at their base a double camber thus putting them back onto the face of the teeth 13B. Alternatively, the teeth 13A and 13B of the two small plates could be offset, in a less pronounced manner, in order to be on a common face after assembly, with a second step distance P2 between the successive teeth. It is noted that the distance value of this second step distance is not relative because the comb has been formed in two halves which can be assembled and/or separated. The value of the second step distance P2 depends on the size of the carriers 5. On each half 14A and 14B, teeth 13A and 13B are necessarily spaced at a second step distance 2P2.

The detachable comb 14 of FIGS. 7 to 9 and the pick-up means 8 of FIG. 5 are used in the following way:

The comb 14 is assembled and its teeth 13A and 13B support respective carriers 5. The elements of identification 4 are picked up, two by two, in the switch cover 1 with the pick-up means 8', consisting of two arms 11A' and 11B'. The two elements are then introduced simultaneously into the first tubular section 6 of the two elements of identification 4 which are situated on two teeth next to the assembled combined comb 14. This procedure is repeated as often as necessary to compose and dispose, at the same time, on two carriers 5 the desired coded message, for example TX1 on the two teeth at the extreme left of FIG. 1.

Once a coded message of identification is composed in pairs on all the teeth of the comb 14, the two halves 14A and 14B of the combined comb are separated in order to obtain the two halves, as shown in FIG. 9, which carry, in the same order, identical coded messages due to the fact that these messages have been composed simultaneously. One of the two halves 14A locates the wire strands of one end of the electric cable, whereas the other half locates the strand of the other end of the same cable. The risk of error in the composition of the coded messages is eliminated where codes have to be identical for both ends of the strands.

It is also noted that the device of the invention permits the advance preparation of coded messages of identification on the combs 9 and 14, preferably on the detachable combs 14A and 14B, whereas previously they had to be composed at the point of connection of the strands, first for one and then for the other end.

FIG. 10 presents a diagrammatic view, on a smaller scale, of part of the two halves 14C and 14D of a combined comb 14 on which the teeth are arranged in pairs 15A to 15E at an interval distance 116 from two nearby teeth capable of receiving a pair of teeth from the other half such that, on the assembled comb, successive teeth, which are spaced at a second step distance P2, belong in pairs and alternately to the half 14C and to the half 14D. The comb of FIG. 10 is used with the pick-up means 8 with four arms 11A to 11D spaced at a second step distance P2 as per FIG. 4.

In this manner, four identical messages of identification can be composed simultaneously on the assembled comb of FIG. 10. After the separation of the two halves of the comb, the four messages are themselves separated into two identical pairs, for example, on the pair 15A and on the pair 15B. At each of the two distant ends of an electric cable, the wire strands and the electric terminals, corresponding to these strands, are easily located without the risk of error in the composition of the four messages. The terminals of the two switch cabinets, which are at equal distances, may also be located.

In accordance with the invention, the comb 9 can moreover be formed by more than two toothed parts, for example, by three parts or more which are separated by the appropriate thickness of parallel joint faces. In this case, the teeth of the assembled comb belong, respectively, to different toothed parts. Preferably, the teeth 13, which are spaced at a step P2 on the assembled comb 9, respectively, belong to the toothed parts. Such a comb is used with a pick-up means 8, the number of arms 11 of the pick-up means is equal to the number of toothed parts of the comb.

The pick-up means 8 may be improved in the following manner: in the example illustrated in FIG. 3 where there are two arms 11A and 11B at a step distance P2=P1, each end part 11A and 11B is followed, beyond the detent collar 12, by a long center part 17A, 17B, respectively, the width of which is substantially equal to the inner width of the first tubular section 6 of the carrier 5 and the length of which is substantially equal to the length of this first tubular section 6. The two arms 11A and 11B are separated by a slot 18, the length of which is identical to the width of the center parts 17A and 17B.

Following the pick-up means, when two elements of identification 4 are mounted by the arms 11A, 11B and when they are introduced simultaneously into the two nearest carriers 5, these elements are pushed by means of the detent collar 12 to the desired depth by also engaging the long center parts 17A and 17B in these carriers 5. The slot 18 permits the separation of one or the other of the near edges of the two center parts and thus facilitates their respective entry to the inside of the carriers 5. In the example illustrated in FIG. 5, where the arms 11A' and 11B' are spaced at a step distance P2=P1, the long center parts 17A' and 17B' are separated by a recess or groove 18' where the groove is only an enlargement corresponding to the width of the slot 18.

Figure 11:
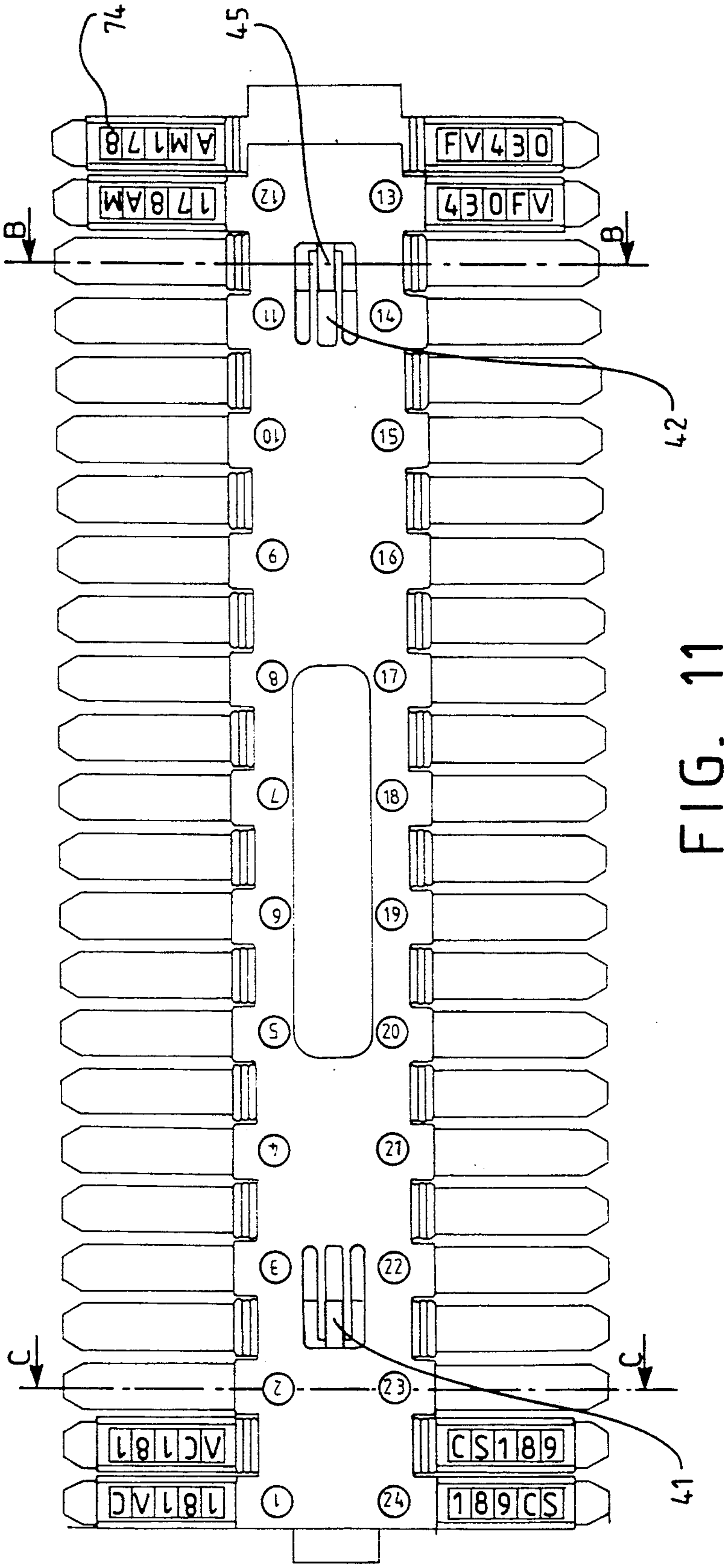
FIG. 11 illustrates a combined comb composed of two comb elements.

FIG. 11 illustrates a comb composed of two elements. The general shape of the elements is similar, however, their top and bottom faces are not exactly of the same structure. It can be recognized in FIG. 11 that neighboring teeth have a different connection structure orientation versus the center section. FIG. 11 additionally shows elements 41 and 42 which allow to hold the two initial combs together as a pair. These connections are preferably furnished as snap-in connections.

Figure 15:
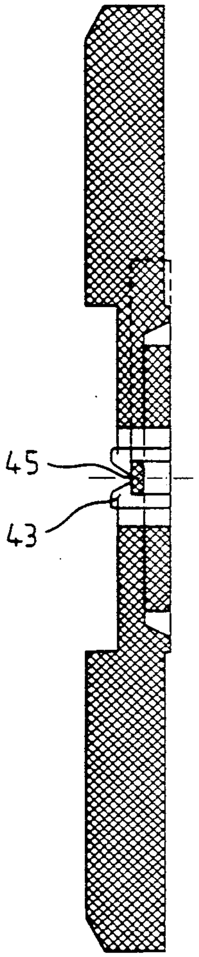
FIG. 15 is a sectional view through two combs held together by a snap-in connection along section line B—B of FIG. 11.
Figure 16:
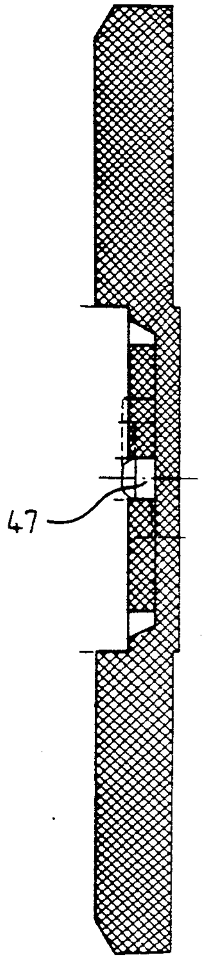
FIG. 16 is a sectional view through the two-part comb with an additional fixing element, along section-line C—C of FIG. 11.

FIG. 15 shows a sectional view through the two combs held together by the snap-in connection 43 into which finger 45 has snapped. There is further provided in FIG. 16 a section through this two-part comb where an additional fixing element 47 is furnished for holding the two combs together and/or for providing alignment. FIG. 11 illustrates that a large area can be used along the periphery of the composed comb to furnish marking element. The marking elements are closely spaced such that, even in cases of closely spaced wire connections, proper markings can be provided.

Figure 12:
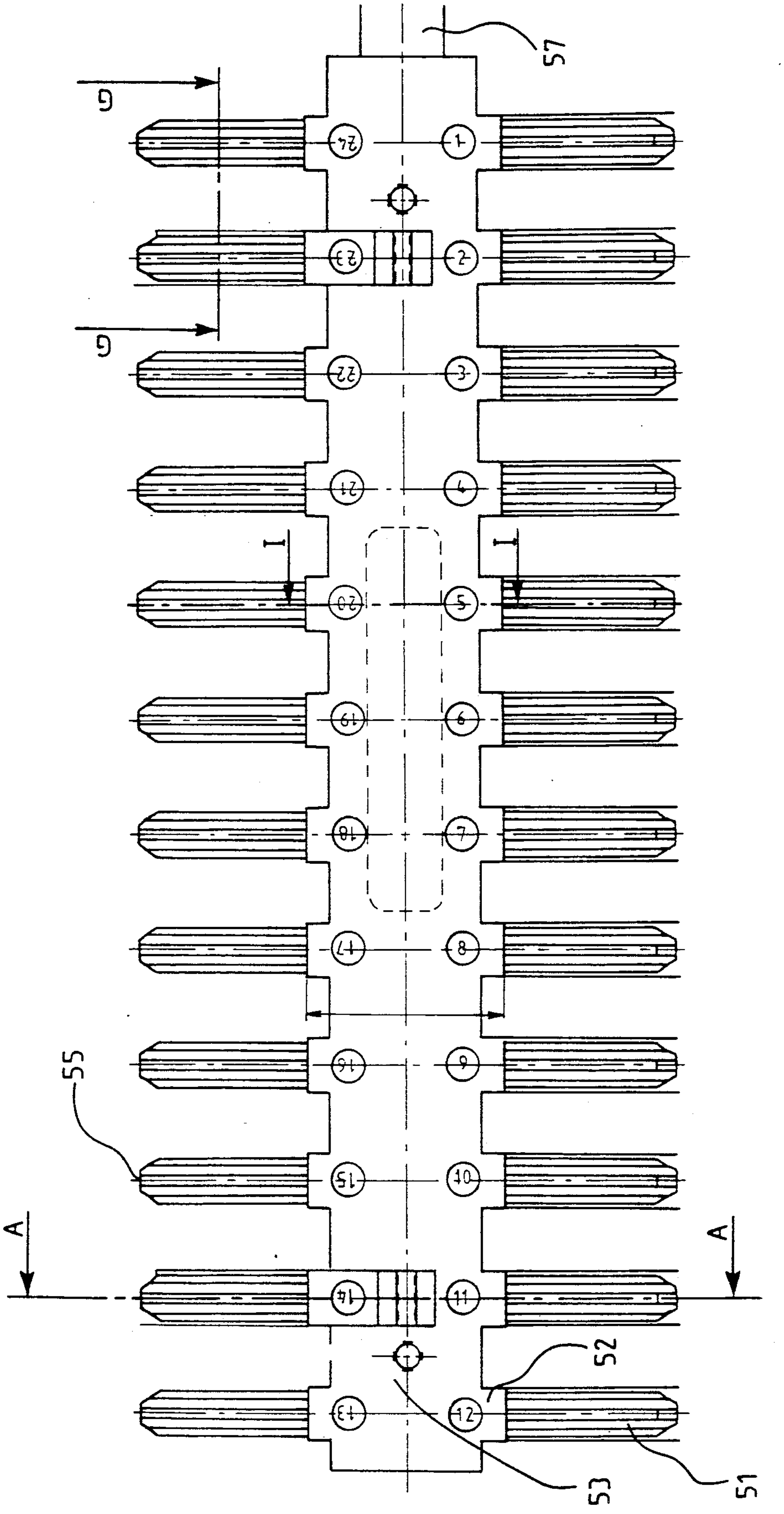
FIG. 12 is a view of the front side of one of the comb elements forming the comb of FIG. 11.

FIG. 12 illustrates a view of one the sections forming the double-comb of FIG. 11, looked upon from the bottom side. The tooth elements are attached to detent collars 52. The teeth 51 are structured in various ways. The end of the teeth can form a curved structure or such curve can be approximated by edge elements joined at obtuse angles. A preferred structure includes a straight end section followed on each side by a section having an angle of about 120 degrees relative to the direction of the straight line section.

Figure 13:
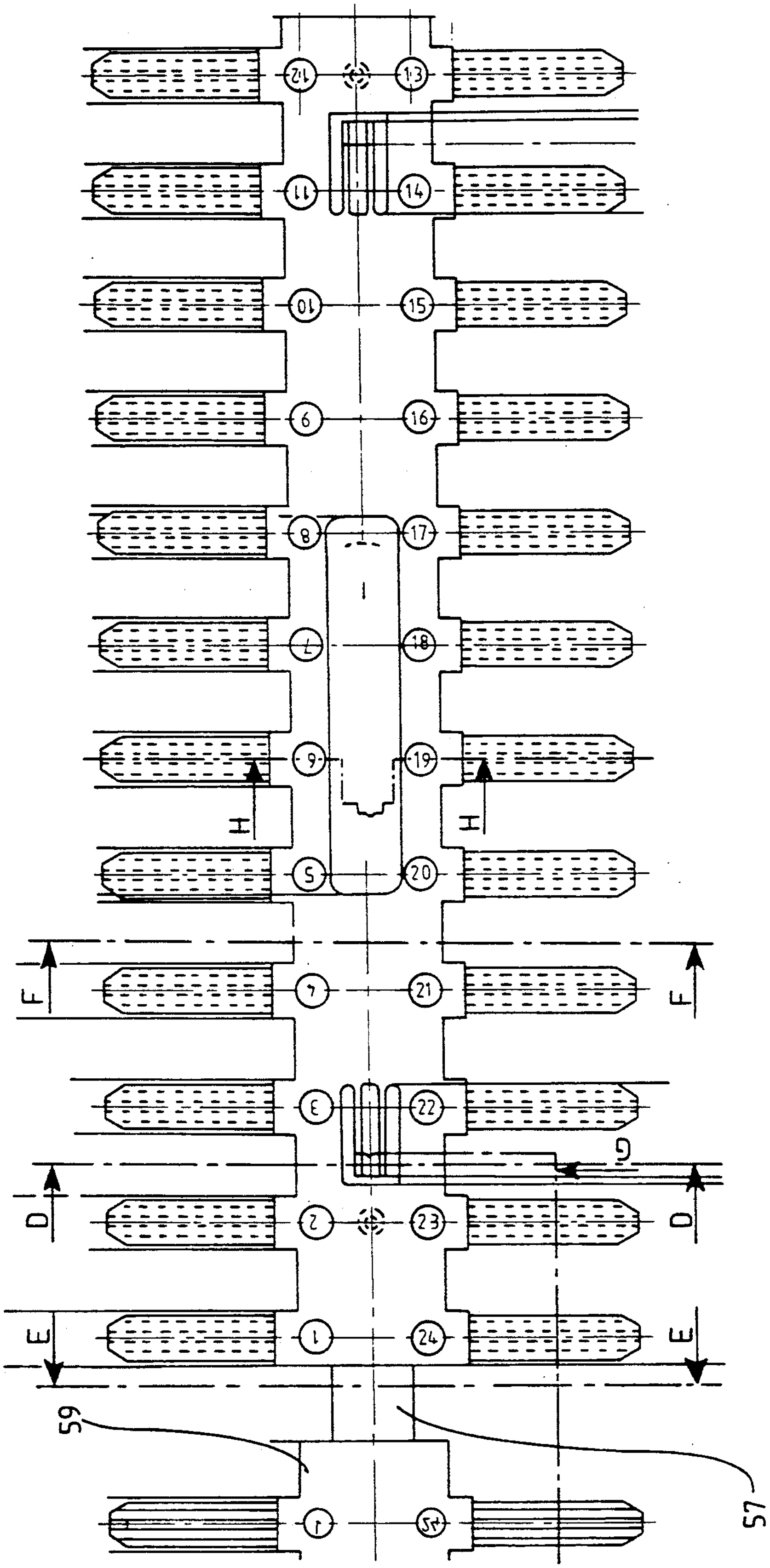
FIG. 13 is a view of the back side of a comb element similar to FIG. 12.

The length of the arms 51 can be from about 0.5 to 2.0 times the width of the inner strip 53 and is preferably from about 0.8 to 1.2 times the width of the inner strip. FIG. 12 allows to recognize in the center of the arms a ridge 55 which assures maintenance of an alignment of the markings relative to the horizontal plane of the plate 53. FIG. 13 illustrates a view similar to that of FIG. 12, however, of an element with the back side. A connection strip 57 is provided which connects the section illustrated in FIG. 12 and FIG. 13. The ridges 55 of a section of the tooth 13 are in FIG. 12 above the paper plane. In the illustration of FIG. 13, the ridges 55 are below the paper plane and the section 12 can be bent relative to the section of the collar of FIG. 13 around the connection section 57 such that the tooth elements of FIG. 12 are substantially disposed inbetween two neighboring tooth elements of FIG. 13. Thus, a practical structure is provided which allows easy handling and safe positioning of the neighboring markers. Preferably, an end section 59 is provided at one end of the strips which allows to superpose this end section to end arms on the second comb section.

Figure 14:
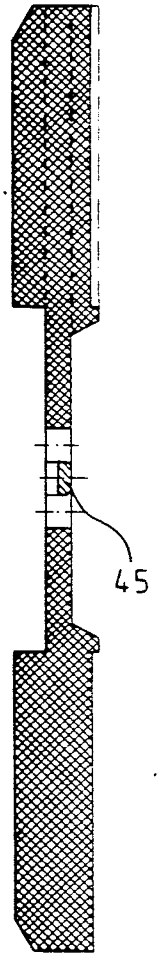
FIG. 14 is a sectional view of the embodiment of FIG. 12 along section line A—A.

FIG. 14 illustrates a sectional view of FIG. 12 with the section line A—A showing the ridge as well as the retainer finger 45.

Figure 22:
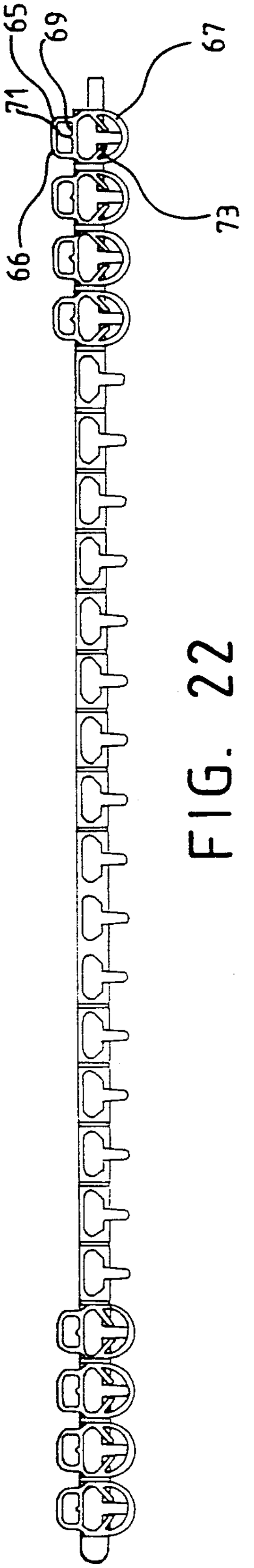
FIG. 22 is a cross-sectional view through the embodiment illustrated in FIG. 11.
Figure 17:
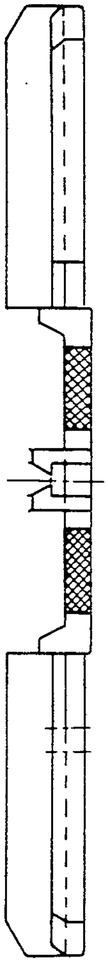
FIG. 17 is a cross-sectional view through the embodiment of FIG. 13, along section line D—D, in the area of a snap-in element.
Figure 18:
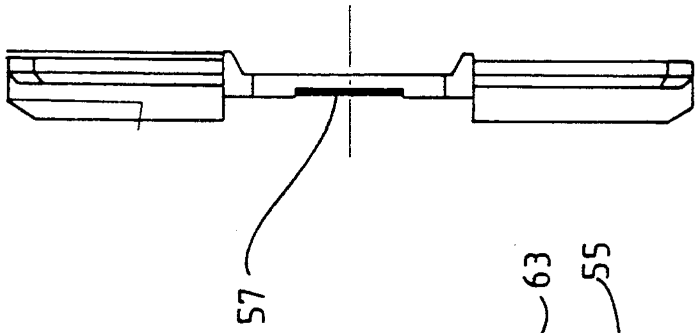
FIG. 18 is a cross-sectional view of a connection section along section line E—E of FIG. 13.
Figure 21:
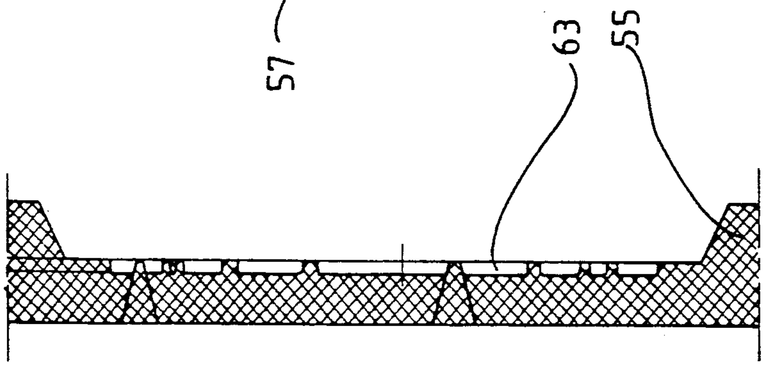
FIG. 21 is a sectional view through the embodiment of FIG. 13, along section line I—I.
Figure 20:
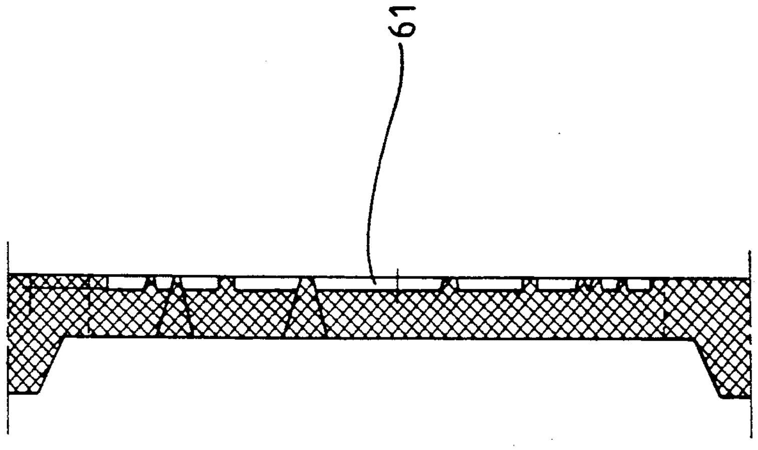
FIG. 20 is a sectional view through the embodiment of FIG. 13, along section line H—H.
Figure 19:
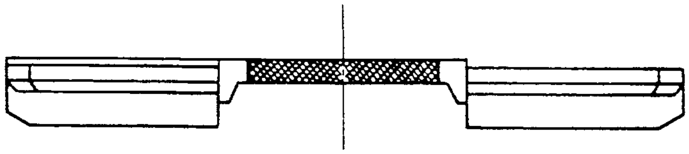
FIG. 19 is a cross-sectional view of a comb section along section line F—F of FIG. 13.
Figure 24:
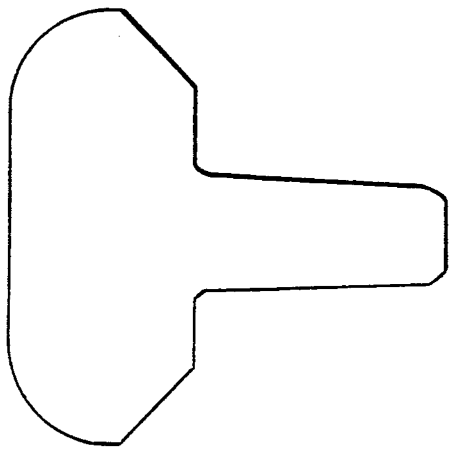
FIG. 24 is a detailed and enlarged view of a tooth arm of FIG. 23.

FIG. 17 illustrates a cross-section through FIG. 13 in the area of the snap-in element. FIG. 18 illustrates the connection section 57 in cross-section showing that this connection section is preferably a flat band, and preferably a flat metal or plastic band, connecting the two comb section. FIG. 19 is a cross-section of FIG. 13 illustrating the structure of the comb section inbetween two neighboring arms. FIG. 20 is an enlarged view in the area of the possibly marking or instruction area on top of the center of the comb section. The recesses 61 for informative material can be provided in a permanent way be molding the comb sections. Similar to FIG. 20, FIG. 21 illustrates a sectional view through FIG. 13. Now the molded recesses 63 for the informative material are disposed on the same side as the ridges 55. FIG. 22 is a cross-sectional view through the arms illustrated in FIG. 11 together with the tubular elements 65. These tubular elements have a particular structure ensuring a maintenance of position of the securing elements as well as maintenance of position versus the chrome as well as maintenance of position of the labelling marker. The securing element comprises a second tubular section 67 and a first tubular section 66. These tubular sections 66 and 67 are separated by a wall 69. The wall 69 carries in its center a ridge 71 inside the upper tubular section 66. The upper tubular section 66 serves to house the identifying and marking element 74 which is provided like a half-cylinder ring. The ridge 71 furnishes a maintaining and securing of position for this half-cylinder ring. Furthermore, the tubular section can have a diameter which is slightly smaller than the diameter of the arms.

Preferably the upper tubular section is made of transparent plastic such that the marking elements 74 can be inserted into the transparent plastic. Furthermore, it is preferred if the transparent plastic of the first tubular section 67 is of such consistency, form, surface, and transparency that it serves as a magnifying glass for the marking element 74 inserted. The second lower tubular section 67 is formed of a structure resembling an oval, hollow cylindrical shape. The lower tubular section 67 comprises two inner ridges 73 one each side which inner ridges 73 contact the ridge of the comb at the end edge of the lower tubular section 67. These inner ridges 73 and their restriction by the ridge of the comb 55 serve to maintain a reliable and aligned position of the tubular section versus the respective tooth arm. Preferably, the inner ridges 73 assume an angle of from about 30 to 60 degrees relative to the plane of the comb section. The volume of the first tubular section can be from about 0.2 to 0.5 the volume of the second tubular section as seen in cross-section.

Figure 23:
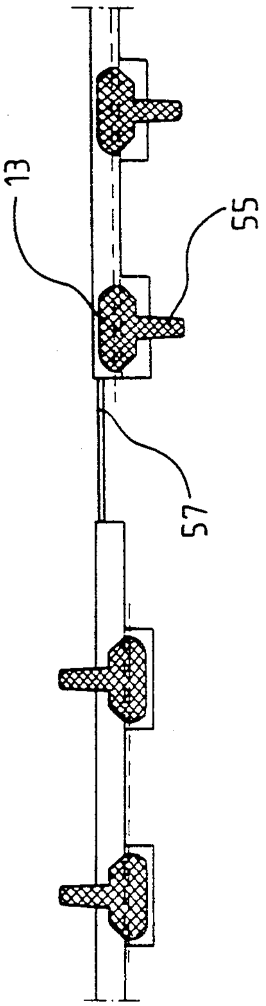
FIG. 23 is a cross-sectional view of a connection section of FIGS. 12 and 13.

The tooth arms 13 are illustrated in cross-sectional view in FIG. 23 which is also illustrates the connection section 57 for the two parts shown in FIGS. 12 and 13. The cross-section of the arm resembles in its upper part to some extent a more or less oval shape which is formed in its upper section around a center which is approximated in its upper section by a nearly straight region having two semi-circles joining and on the lower side by a bevelled section at an angle of from about 35 to 55 degrees relative to the horizontal. The center part on the lower side carries the ridge 55. The ridge is formed such that the two opposing wider sides of the ridge 55 have an angle relative to each other from about 2 to 6 degrees and preferably of from about 3 to 5 degrees with the wider end toward the oval-shaped section. The length of the ridge 55 can be from about 0.2 to 0.8 and preferably from about 0.5 to 0.7 times the width of the arm at the respective position. The average thickness of the ridge 55 can be from about 0.3 to 0.8 and preferably of from about 0.5 to 0.7 times the thickness of the approximately oval cross-section. The disposition of the ridge 55 is preferably perpendicular to the short axis of the approximately oval area.

Figures 25, 26, 27, 28, 29, 30, 31:
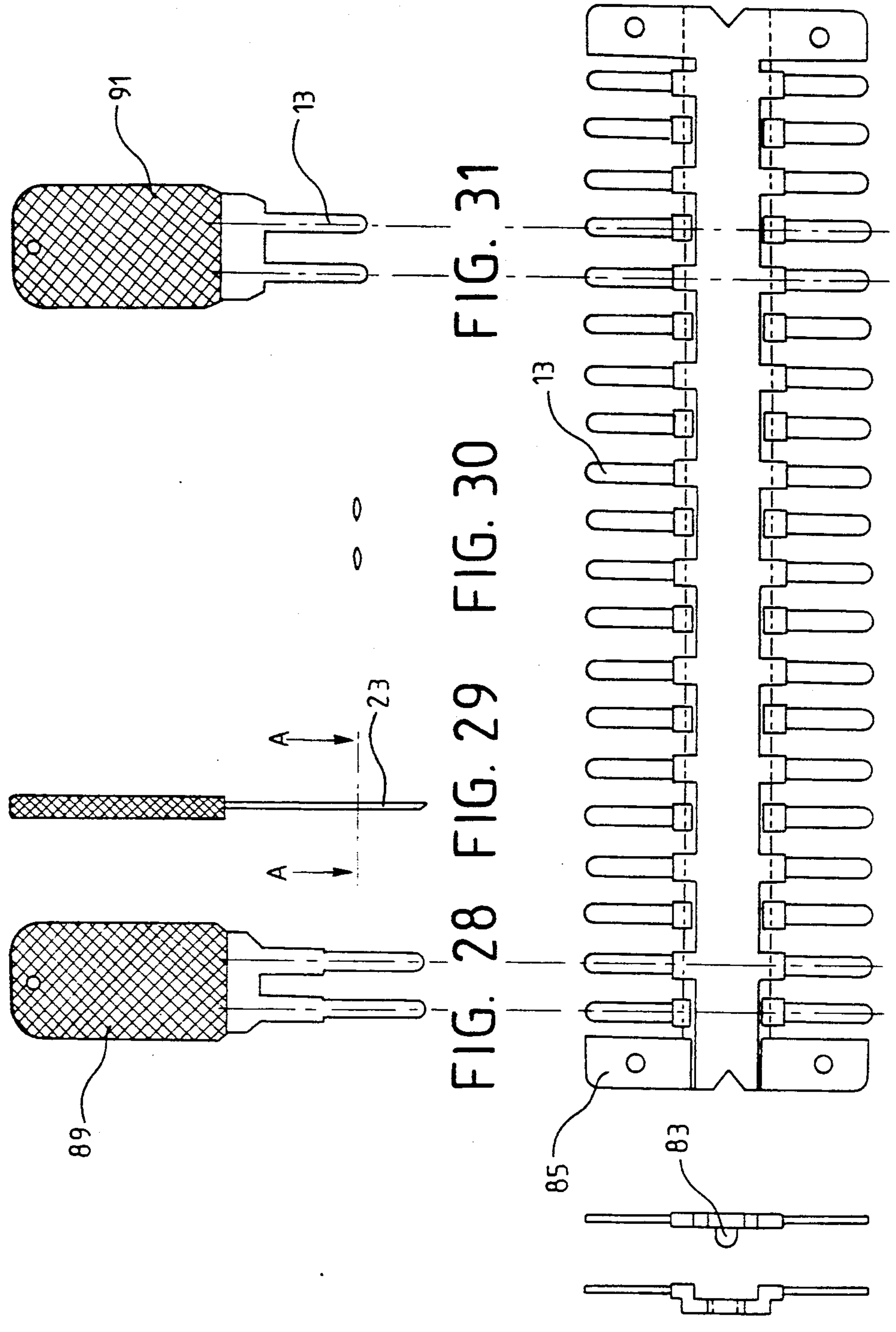
FIG. 25 is a schematic view of another embodiment of a combined comb.
FIG. 26 is a cross-sectional view of a first joined section of FIG. 25.
FIG. 27 is a cross-sectional view of a second joined section of FIG. 25.
FIG. 28 is a top view onto a pick-up similar to FIG. 5.
FIG. 29 is a cross-sectional view of the pick-up according to FIG. 28.
FIG. 30 is a cross-sectional view of the embodiment of FIG. 29 along section line A—A.
FIG. 31 is a top view onto another embodiment of a pick-up similar to FIG. 28.

FIG. 25 illustrates a schematic view of an embodiment with two arms superposed, however, where there is a substantial space between the arms, which is from about 1.1 to 2.0 times the width of these arms. This is in contrast to the illustration of FIG. 11, where the width of the section between the two neighboring arms is only about 0.1 to 0.2 times the width of the arms.

FIG. 26 illustrates one of the two joined sections of FIG. 25 in cross-section and FIG. 27 illustration a second one of the two joined sections and snap connections between these two sections is illustrated by way of a pin 83. It can be seen that the center body section of the comb is about from 1.5 to 3.0 times the thickness of the tooth arms 13. End sections 85 are provided for aligning and joining these comb sections to each other as well as to a supporting structure.

FIG. 28 shows a pick-up similar to the pick-up illustrated in FIG. 5. However, the holder 89 is of a more pronounced and elaborate structure as compared to the holder section 8' of FIG. 5.

FIG. 29 illustrates a cross-sectional view of the pick-up of FIG. 28 showing the relative thickness of the holder versus that of the arms 23.

FIG. 30 shows another cross-section along section line A of FIG. 29.

FIG. 31 illustrates further an embodiment of a pick-up where the handle 91 is pronounced but where the arms 13 are joined without a substantial center part to the holder.

Figure 33:
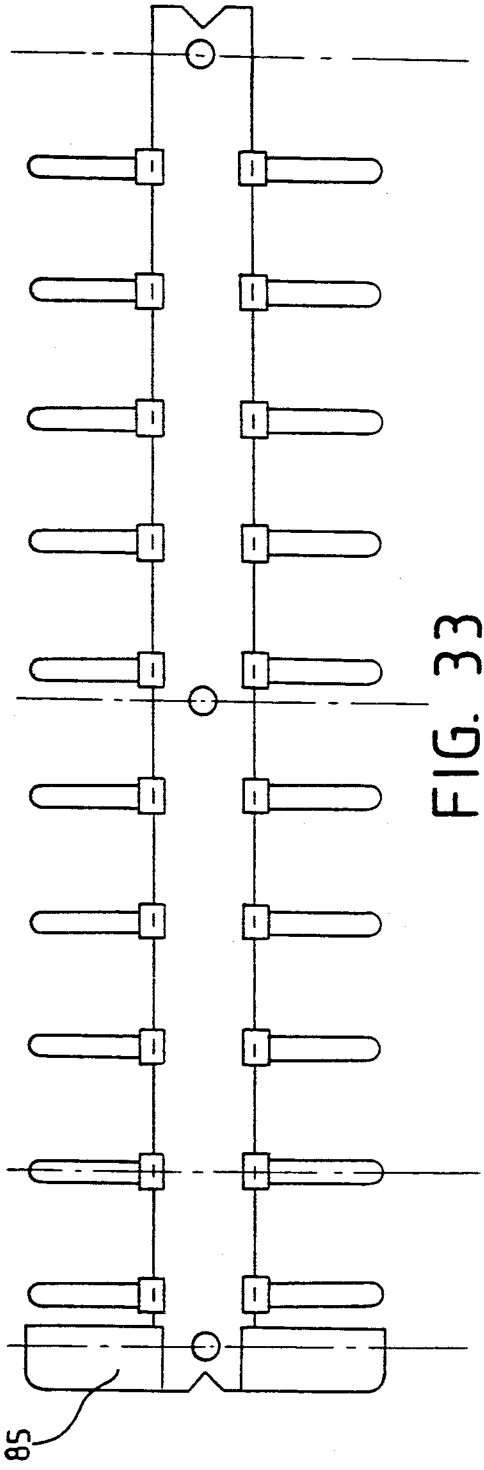
FIG. 33 is a schematic view of a further individual comb element, the comb element of FIG. 32 forming together with the comb element of FIG. 33 the combined comb of FIG. 25.
Figure 32:
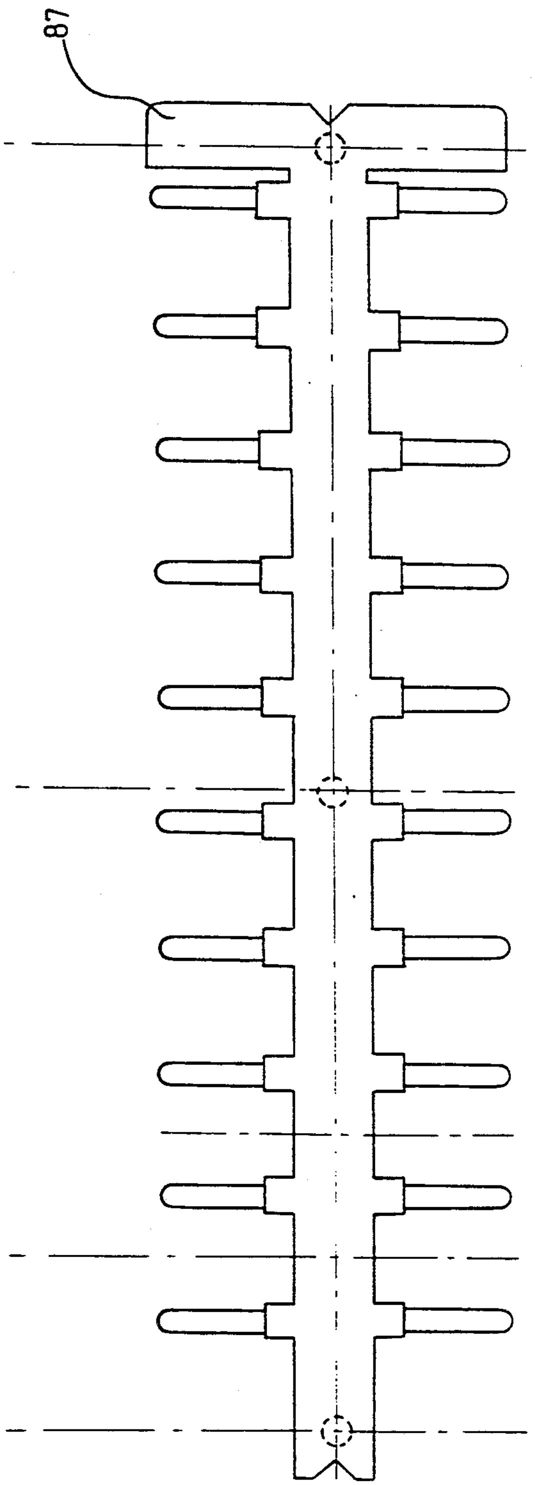
FIG. 32 is a schematic view of an individual comb element.

FIGS. 32 and 33 show individual comb elements which are employed to compose the element illustrated in FIG. 25. The combs are furnished such that each one has one attachment section at one end and they are superposed such that the joined structure has an end section 85, 87 on each side. The cross-section of FIG. 32 corresponds to FIG. 26 and the cross-section of FIG. 33 corresponds to FIG. 27.

Figure 34:
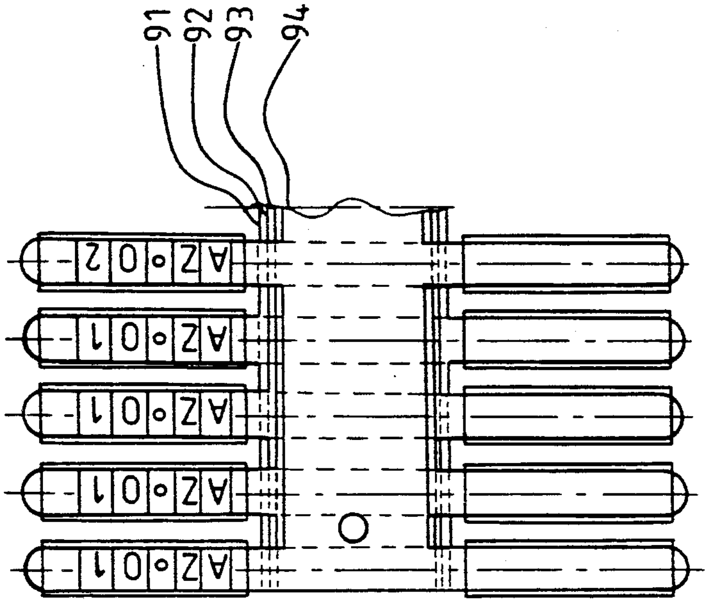
FIG. 34 is a schematic view of a structure where four comb elements are joined together.
Figure 35:
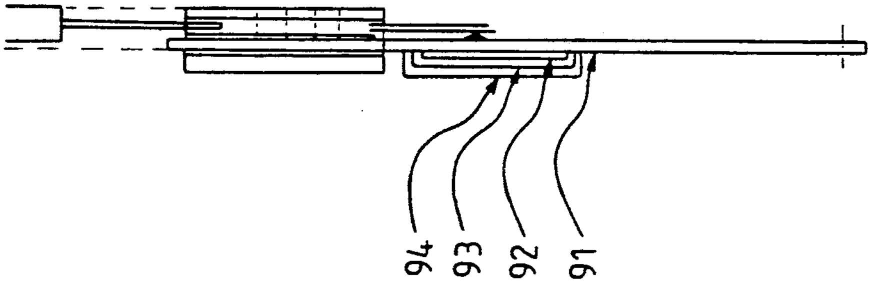
FIG. 35 is a sectional view of a superpositioning in the center of the body section of the combined comb of FIG. 34.

FIGS. 34 and 35 illustrate a structure where four comb elements 91, 92, 93, and 94 are joined together. Each of the comb sections has a step distance equal to that of each of the other comb sections and corresponding to four times the step distance provided in the assembled product of the four comb sections.

FIG. 35 illustrates the superposition in the center of the center body sections of the individual combs employed. Thus, whereas the arms of all the assembled comb sections are at the same level in the final product. Thus, the present invention provides that a superposed multi-comb structure, each having teeth on the two sides and where the combs are staggered relative to their respective center section in a direction perpendicular to the horizontal plane of said center section such that, in an assembled structure, all teeth are disposed at the same height level even though the center sections assume different height levels and are superposed. The staggering in general will correspond to a multiple of the thickness of the center areas of the comb sections.

The retaining of the four comb sections can be performed very similar to that illustrated in FIGS. 12 and 13, employing fastening elements and/or screw connections.

According to another feature of the invention a comb structure is provided for marking of wire harnesses. A first comb has a first body of elongated shape and has teeth disposed on two parallel and mutually opposed sides of the first body. The teeth are disposed at a spacing distance to each other. The first comb has a substantially flat surface to form an outer surface of a combined comb. A second comb has a second body of elongated shape and has teeth disposed on two parallel and mutually opposed sides of the second body. The teeth are disposed at a spacing distance to each other. The spacing distance between the teeth of the second comb is equal to the spacing distance between the teeth of the first comb. The second comb is adapted to be placed on a side of the first comb disposed opposite to the flat surface of the first comb. The teeth of the second comb are disposed substantially in the same plane as the teeth of the first comb. The teeth of the second comb are staggered relative to the body of the second comb such that the body of the second comb is disposed next to the body of the first comb and such that the teeth of the second comb are disposed in a single plane together with the teeth of the first comb.

The distances between neighboring teeth of the first comb and teeth of the second comb can all be substantially equal.

A third comb can have a third body of elongated shape and can have teeth disposed on two parallel and mutually opposed sides of the third body. The teeth of the third comb can be disposed at a regular spacing distance to each other. The spacing distance between the teeth of the third comb can be equal to the spacing distance between the teeth of the first comb or of the second comb. The third comb can be adapted to be placed on a side of the second comb disposed opposite to the side of the second comb abutting the first comb. The teeth of the third comb can be disposed substantially in the same plane as the teeth of the first comb and of the second comb. The teeth of the third comb can be staggered relative to the body of the third comb such that the body of the third comb can be disposed next to the body of the second comb and such that the teeth of the third comb can be disposed in a single plane together with the teeth of the first comb and with the teeth of the second comb.

The distances between neighboring teeth of the first comb and teeth of the second comb and between neighboring teeth of the first comb and of the third comb can all be substantially equal.

A fourth comb can have a fourth body of elongated shape and can have teeth disposed on two parallel and mutually opposed sides of the fourth body. The teeth of the fourth comb can be disposed at a distance spacing to each other. The spacing distance between the teeth of the fourth comb can be equal to the spacing distance of the teeth of the first comb or of the second comb or of the third comb. The fourth comb can be adapted to be placed on a side of the third comb disposed opposite to the side of the third comb abutting the second comb. The teeth of the fourth comb can be disposed substantially in the same plane as the teeth of the first comb and the teeth of the second comb and the teeth of the third comb. The teeth of the fourth comb can be staggered relative to the body of the fourth comb such that the body of the fourth comb can be disposed next to the body of the third comb and such that the teeth of the fourth comb can be disposed in a single plane together with the teeth of the first comb and with the teeth of the second comb and with the teeth of the third body.

The distances between neighboring teeth of the comb combined of the first comb, the second comb, the third comb, and the fourth comb can all be substantially equal.

Attachment means can be furnished at the first body for attaching a second body to the first body.

One of the teeth can be formed substantially flat with a reinforcement ridge disposed in the middle of the back side of the respective tooth.

Label tubes can be disposed on one of the teeth. The label tubes can be formed as double tubes joined by a separating wall. A first section of the double tube can serve to confine labels. A second section of the double tube can surround the tooth.

A ridge can be disposed at the separating wall of the double tube inside of the first section for aligning the label. Elastic protrusions can be disposed inside of the second section of the double tube on the inside of an outer wall for properly positioning one of the label tubes on the reinforcement ridge of the tooth with reinforcement ridge by restraining the motion of the label tube around the respective tooth.

It will be understood that each of the elements described above, or two or more together, may also find a useful application in other types of pick-up and assembly device differing from the types described above.

While the invention has been illustrated and described as embodied in the context of a device for pick-up and assembly of identification elements of cables and electrical appliances, it is not intended to be limited to the details shown, since various modifications and structure changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for attaching coded messages of identification to wire strands and electric terminals comprising:

elements of identification each comprising a coded message of identification;

carriers including an elongated body and adapted to receive and carry each a series of elements of identification in a removable manner, with each individual carrier adapted to be mounted to a tooth of a respective comb at a minimum first step distance;

a first comb having a first body with teeth arranged in parallel at two opposite sides of the first body and said teeth spaced at a second step distance;

a second comb having a second body with teeth arranged in parallel at two opposite sides of the second body and said teeth spaced at a second step distance, where the second body is attached in a substantially parallel position to the first body to form a combined comb, such that there is generated an alternate sequence of teeth belonging to the first comb and of teeth belonging to the second comb, arranged on common elongated parallel teeth of the combined comb, and wherein the value of the second step distance is a simple multiple of a value of a first step distance disposed between the alternating teeth of the first comb and of the second comb on the combined comb, and wherein the teeth are adapted in their position of being uniquely associated with respective wire strands or electrical terminals.

2. The device according to claim 1, wherein the teeth of the second comb are disposed at a level parallel to the level of the body of the second comb, but are displaced in a direction perpendicular to the second comb body by a spacing amounting to about the thickness of the first comb to allow for positioning of the second comb relative to the first comb such that the teeth of the first comb and the teeth of the second comb are disposed in a single plane.

3. Device according to claim 1, wherein the first comb forms a first half of the combined comb, and wherein the second comb forms a second half of the combined comb, and wherein the two halves are assembled and separated on joint faces, wherein the successive teeth of the combined comb belong, alternatively, to the first half or to the second half of the combined comb and are being separated from each other by a step distance.

4. The device according to claim 1, wherein the first comb forms a first half, and wherein the second comb forms a second half, where the first half and the second half are assembled and separated by appropriate means on one or the other of joint faces of appropriate thickness, wherein successive teeth of the combined comb belong, alternatively, to one or the other half, and are divided on one half into pairs of two teeth, where the pairs are separated by a space interval capable of receiving a pair of two teeth belonging to the other half, and wherein the successive teeth are separated on the combined comb by the second step distance.

5. The device according to claim 1, wherein the teeth of the second comb are disposed in a manner such that all teeth of the combined comb are arranged on the same face once the two halves are assembled.

6. The device according to claim 1, further comprising a pick-up with at least two parallel arms, spaced at a second step distance which is identical to the second step distance of the teeth of the comb, whereby each of these arms possesses an extreme part capable of being threaded into the tubular section of the elements of identification and limited at the end opposite to the free end by a detent collar.

7. A device for applying coded identification messages onto wire strands and electric terminals comprising:

partly tubular elements of identification;

distinct carrier rows for supporting the partly tubular elements of identification, wherein the partly tubular elements of identification are disposed on the distinct carrier rows spaced relative to each other by a defined first step, wherein the elements of identification carry the same symbol on each carrier row, wherein carriers are capable of receiving each a series of elements of identification including a coded message of identification, and wherein each element of identification is capable of being coordinated to a respective wire strand and an electrical terminal in order to identify the respective wire or terminal;

a comb with distinct teeth rows for supporting the carriers.

8. The device according to claim 7, wherein the teeth of the comb are arranged in parallel and spaced at a second step distance, where the value of the second step distance is equal to, or equal to a simple multiple of the value of a first step distance of the elements of identification disposed on the carriers, whereby these teeth conform to receive and carry, in a removable manner, said carrier rows for the elements of identification.

9. The device according to claim 8, wherein the comb is formed as a combined comb composed of a first comb section with a first set of teeth and of a second comb section with a second set of teeth, assembled and separatable along one or the other of joint faces.

10. The device according to claim 9, wherein the combined comb consists of two half comb sections and wherein successive teeth of the assembled combined comb belong, alternatively, to one or the other half and are separated on each half by a second step distance.

11. Device according to claim 10, wherein the teeth of one of the halves of the combined comb is arranged in such a manner that all teeth of the combined comb are arranged on one and the same face of the combined comb once the two halves are assembled.

12. Device according to claim 7, wherein the combined comb comprises two halves joined together by attachment means along a joint abutting face on each half, wherein successive teeth of the assembled combined comb belong, alternatively, to one or the other half and said teeth being divided on one half into pairs of two successive teeth having a spacing interval in between capable of receiving a pair of two teeth belonging to the other half, where successive teeth are separated on the assembled comb by a second step distance.

13. The device according to claim 12, wherein the teeth of at least one of the halves of the combined comb are transported in a manner so that all teeth are arranged in a single plane after attaching of the two halves to each other.

14. A comb structure for marking of wire harnesses comprising:

a first comb having a first body of elongated shape, and having teeth disposed on two parallel and mutually opposed sides of the first body, where the teeth are disposed at a spacing distance to each other and wherein the first comb has a substantially flat surface to form an outer surface of a combined comb;

a second comb having a second body of elongated shape and having teeth disposed on two parallel and mutually opposed sides of the second body, where the teeth are disposed at a spacing distance to each other, where the spacing distance between the teeth of the second comb is equal to the spacing distance between the teeth of the first comb, and wherein the second comb is adapted to be placed on a side of the first comb disposed opposite to the flat surface of the first comb;

wherein the teeth of the second comb are disposed substantially in the same plane as the teeth of the first comb, and wherein the teeth of the second comb are staggered relative to the body of the second comb such that the body of the second comb is disposed next to the body of the first comb and such that the teeth of the second comb are disposed in a single plane together with the teeth of the first comb.

15. The comb structure according to claim 14, wherein the distance between neighboring teeth of the first comb and teeth of the second comb are all substantially equal.

16. The comb structure according to claim 14 further comprising:

a third comb having a third body of elongated shape and having teeth disposed on two parallel and mutually opposed sides of the third body, where the teeth of the third comb are disposed at a regular spacing distance to each other, where the spacing distance between the teeth of the third comb is equal to the spacing distance between the teeth of the first comb or of the second comb, and wherein the third comb is adapted to be placed on a side of the second comb disposed opposite to the side of the second comb abutting the first comb;

wherein the teeth of the third comb are disposed substantially in the same plane as the teeth of the first comb and of the second comb, and wherein the teeth of the third comb are staggered relative to the body of the third comb such that the body of the third comb is disposed next to the body of the second comb and such that the teeth of the third comb are disposed in a single plane together with the teeth of the first comb and with the teeth of the second comb.

17. The comb structure according to claim 16, wherein the distances between neighboring teeth of the first comb and teeth of the second comb and between neighboring teeth of the first comb and of the third comb are all substantially equal.

18. The comb structure according to claim 16, further comprising:

a fourth comb having a fourth body of elongated shape and having teeth disposed on two parallel and mutually opposed sides of the fourth body, where the teeth of the fourth comb are disposed at a distance spacing to each other, where the spacing distance between the teeth of the fourth comb is equal to the spacing distance of the teeth of the first comb or of the second comb or of the third comb, and wherein the fourth comb is adapted to be placed on a side of the third comb disposed opposite to the side of the third comb abutting the second comb;

wherein the teeth of the fourth comb are disposed substantially in the same plane as the teeth of the first comb and the teeth of the second comb and the teeth of the third comb, and wherein the teeth of the fourth comb are staggered relative to the body of the fourth comb such that the body of the fourth comb is disposed next to the body of the third comb and such that the teeth of the fourth comb are disposed in a single plane together with the teeth of the first comb and with the teeth of the second comb and with the teeth of the third body.

19. The comb structure according to claim 18, wherein the distances between neighboring teeth of the comb combined of the first comb, the second comb, the third comb, and the fourth comb are all substantially equal.

20. The comb structure according to claim 14, further comprising:

attachment means furnished at the first body for attaching a second body to the first body.

21. The comb structure according to claim 14, wherein one of the teeth is formed substantially flat with a reinforcement ridge disposed in the middle of the back side of the respective tooth.

22. The comb structure according to claim 21, further comprising:

label tubes disposed on one of the teeth, wherein the label tubes are formed as double tubes joined by a separating wall, wherein a first section of the double tube serves to confine labels and where a second section of the double tube surrounds the tooth.

* * * * *

UNITED STATES PATENT AND TRADEMARK OFFICE

CERTIFICATE OF CORRECTION

PATENT NO. : 5,078,829

DATED : January 7, 1992

INVENTOR(S) : Flavio Morosini

It is certified that error appears in the above-identified patent and that said Letters Patent is hereby corrected as shown below:

Title page under [56] References Cited, U.S. PATENT DOCUMENTS: delete "Morosihi" and substitute therefor --Morosini--.

Signed and Sealed this

Twenty-seventh Day of April, 1993

*Attest:*

MICHAEL K. KIRK

*Attesting Officer*

*Acting Commissioner of Patents and Trademarks*